United States Patent
Casci et al.

(10) Patent No.: US 10,710,863 B2
(45) Date of Patent: Jul. 14, 2020

(54) WATER BOTTLE FILLING SYSTEM FOR A MOTOR VEHICLE

(71) Applicant: FORD GLOBAL TECHNOLOGIES, LLC, Dearborn, MI (US)

(72) Inventors: John Paul Casci, Westland, MI (US); Scott Benjamin Scheraga, Canton, MI (US); Joshua Dietrich, Farmington Hills, MI (US); Courtney Lynne L'Arrivée, Melvindale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 15/992,708

(22) Filed: May 30, 2018

(65) Prior Publication Data

US 2019/0367346 A1    Dec. 5, 2019

(51) Int. Cl.

| | |
|---|---|
| B65B 1/20 | (2006.01) |
| B67D 1/00 | (2006.01) |
| B67D 1/08 | (2006.01) |
| B67D 1/10 | (2006.01) |
| B67D 1/12 | (2006.01) |
| C02F 9/00 | (2006.01) |
| C02F 1/02 | (2006.01) |
| C02F 1/28 | (2006.01) |
| C02F 1/32 | (2006.01) |
| C02F 1/68 | (2006.01) |
| C02F 1/78 | (2006.01) |

(52) U.S. Cl.
CPC ......... *B67D 1/0014* (2013.01); *B67D 1/0895* (2013.01); *B67D 1/10* (2013.01); *B67D 1/1252* (2013.01); *C02F 9/00* (2013.01); *C02F 1/02* (2013.01); *C02F 1/283* (2013.01); *C02F 1/325* (2013.01); *C02F 1/68* (2013.01); *C02F 1/78* (2013.01); *C02F 2209/42* (2013.01)

(58) Field of Classification Search
CPC .. B67D 1/0014; B67D 1/0009; Y02A 20/112; Y02A 20/214; B60H 1/32331
See application file for complete search history.

(56) References Cited

U.S. PATENT DOCUMENTS

| 5,285,654 A | 2/1994 | Ferdows |
| 5,435,151 A | 7/1995 | Han |

(Continued)

FOREIGN PATENT DOCUMENTS

| CN | 202264679 U | 6/2012 |
| CN | 205857291 U | 1/2017 |

(Continued)

OTHER PUBLICATIONS

English Machine Translation of CN202264679U.

(Continued)

*Primary Examiner* — Reinaldo Sanchez-Medina
(74) *Attorney, Agent, or Firm* — David Coppiellie; King & Schickli, PLLC

(57) ABSTRACT

A water bottle filling system includes a water collection vessel, a water storage reservoir having an inlet valve and an outlet valve, an air pump connected to the water storage reservoir, a coupling downstream from the outlet valve and a refillable water bottle connected to the coupling. A method for collecting, cleaning and dispensing potable water into a refillable water bottle is also provided.

19 Claims, 2 Drawing Sheets

(56) References Cited

U.S. PATENT DOCUMENTS

| | | | |
|---|---|---|---|
| 6,058,718 | A | 5/2000 | Forsberg et al. |
| 6,182,453 | B1 | 2/2001 | Forsberg |
| 6,508,208 | B1 | 1/2003 | Frasure |
| 6,684,648 | B2 | 2/2004 | Faqih |
| 6,997,004 | B1 | 2/2006 | Pittman |
| 8,021,542 | B2 | 9/2011 | Kirts |
| 8,252,174 | B2 | 8/2012 | Jones et al. |
| 10,442,405 | B2 * | 10/2019 | Weigle ............. B60S 1/50 |
| 2004/0040322 | A1 | 3/2004 | Engel et al. |
| 2007/0000906 | A1 | 1/2007 | Kaastra |
| 2007/0138006 | A1 | 6/2007 | Oakes et al. |
| 2010/0025311 | A1 | 2/2010 | Jones et al. |
| 2012/0221198 | A1 | 8/2012 | Kohavi et al. |
| 2012/0247135 | A1 | 10/2012 | Fakieh |
| 2013/0206266 | A1 | 8/2013 | Stenhouse |
| 2016/0083936 | A1 | 3/2016 | Martin et al. |
| 2017/0153025 | A1 | 6/2017 | Zhao et al. |

FOREIGN PATENT DOCUMENTS

| | | |
|---|---|---|
| CN | 206266379 U | 6/2017 |
| DE | 102008037570 A1 | 6/2010 |
| JP | 2172587 A | 7/1990 |
| JP | 2004120903 A | 4/2004 |
| JP | 2007073237 A | 3/2007 |
| KR | 20070059773 A | 6/2007 |
| WO | 2004020919 A1 | 3/2004 |
| WO | 2009073134 A1 | 6/2009 |
| WO | 2013032497 A1 | 3/2013 |
| WO | 2015148715 A1 | 10/2015 |

OTHER PUBLICATIONS

English Machine Translation of CN205857291U.
English Machine Translation of CN206266379U.
English Machine Translation of DE102008037570A1.
English Machine Translation of JP2004120903A.
English Machine Translation of JP2007073237A.
English Machine Translation of JP2172587A.
English Machine Translation of KR20070059773A.
Tripathi et al; "Atmospheric Water Generator"; International Journal of Enhanced Research in Science, Technology & Engineering; ISSN: 2319-7463, vol. 5 Issue 4, Apr. 2016.
"Disinfection Methods"; SAHRA website, published Sep. 12, 2011; accessed at http://cierzo.sahra.arizona.edu/programs/akyw/disinfection.html.
"How to Purify Your Drinking Water"; North Miami Beach Florida; published Aug. 27, 2013; accessed at https://www.citynmb.com/index.asp?Sec={29A1A7C9-956A-4B72-B13C-57F75F2C599B}.
Non-Final Rejection dated Oct. 7, 2016 for U.S. Appl. No. 14/490,744.
Non-Final Rejection dated Feb. 22, 2017 for U.S. Appl. No. 14/490,744.

* cited by examiner

WATER BOTTLE FILLING SYSTEM FOR A MOTOR VEHICLE

TECHNICAL FIELD

This document relates generally to water bottle filling systems and, more particularly, to a water bottle filling system particularly adapted for incorporation into a motor vehicle.

BACKGROUND

This document relates to a new and improved water bottle filling system that is particularly adapted for use in a motor vehicle. The system includes a single air pump that may be utilized to move air and water through the water bottle filling system. Advantageously, the new and improved water bottle filling system is easily controlled, allows for a sealed connection with a water bottle thereby preventing contaminants from entering the system, and allows for quick and efficient water bottle filling without relying upon gravity. Since water is positively forced from a reservoir to the water bottle, the storage reservoir is no longer required to be above the water bottle for gravity feed. Thus, there is greater design freedom when deciding vehicle packaging locations. From the above it is clear that the new and improved water bottle filling system represents a significant advance in the art.

SUMMARY

In accordance with the purposes and benefits described herein, a new and improved water bottle filling system is provided. That water bottle filling system comprises a water storage reservoir having an inlet valve and an outlet valve, an air pump connected to the water storage reservoir, a coupling downstream from the outlet valve and a refillable water bottle connected to the coupling.

The water bottle filling system may further include a water collection vessel upstream from the inlet valve. The water bottle filling system may further include a water level monitoring device adapted to monitor the level of water within the water storage reservoir. The water bottle filling system may further include a water cleaning feature for cleaning water in the water storage reservoir. That water cleaning feature may be selected from a group of devices consisting of a heating element, an ultraviolet (UV) water sterilization device, an ozone generator and combinations thereof.

The water bottle filling system may further include a filter feature between the outlet valve and the coupling connected to the refillable water bottle. That filter feature may be selected from a group of filters consisting of a carbon filter for removing chemical contaminants from the water being dispensed into the refillable water bottle, a re-mineralization filter for adding desirable minerals back into the water being dispensed into the water bottle and combinations thereof. The water storage reservoir of the water bottle filling system may further include a drain valve.

The water bottle filling system may further include a controller connected to the inlet valve, the outlet valve, the drain valve and the air pump. That controller may be configured to (a) draw water, by the air pump, from the water collection vessel into the water storage reservoir through the inlet valve, (b) clean water in the water storage reservoir, by means of the water cleaning filter, (c) draw air, by the air pump, from the refillable water bottle through the coupling and the outlet valve and (d) force water from the water storage reservoir through the outlet valve to the refillable water bottle. That water may be forced passively by air pressure differential and/or operation of the air pump. The controller may also be connected to and configured to control the water cleaning feature and connected to and be configured to receive data from the water level monitoring device.

In accordance with an additional aspect, a new and improved method for collecting, cleaning and dispensing potable water is provided. That method comprises the steps of: (a) collecting water in a water collection vessel, (b) transferring that water under pressure provided by an air pump into a water storage reservoir and (c) dispensing that water under pressure into a refillable water bottle downstream from the water storage reservoir.

More specifically, the method may include the step of cleaning the water in the water storage reservoir by operation of a water cleaning feature. In addition, the method may include the step of opening an inlet valve and closing an outlet valve of the water storage reservoir prior to transferring water to the water storage reservoir. Still further, the method may include the step of closing the inlet valve and opening the outlet valve prior to dispensing water to the refillable water bottle.

Still further, the method may include the step of connecting the refillable water bottle downstream from the outlet valve by an airtight coupling. Further, the method may include the step of removing air, by the air pump, from the refillable water bottle prior to dispensing water into the refillable water bottle. In addition the method may include the step of monitoring a level of the water in the water storage reservoir. Further, the method may include the step of cleaning the water by at least one of UV sterilization, ozone generation and heating.

In the following description, there are shown and described several preferred embodiments of the water bottle filling system and the related method for collecting, cleaning and dispensing potable water. As it should be realized, the water bottle filling system and related method are capable of other, different embodiments and their several details are capable of modification in various, obvious aspects all without departing from the water bottle filling system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the water bottle filling system and method of collecting, cleaning and dispensing potable water and together with the description serve to explain certain principles thereof.

Reference will now be made in detail to the present preferred embodiments of the water bottle filling system and related method, examples of which are illustrated in the accompanying drawing figures.

DETAILED DESCRIPTION

Figure 1:
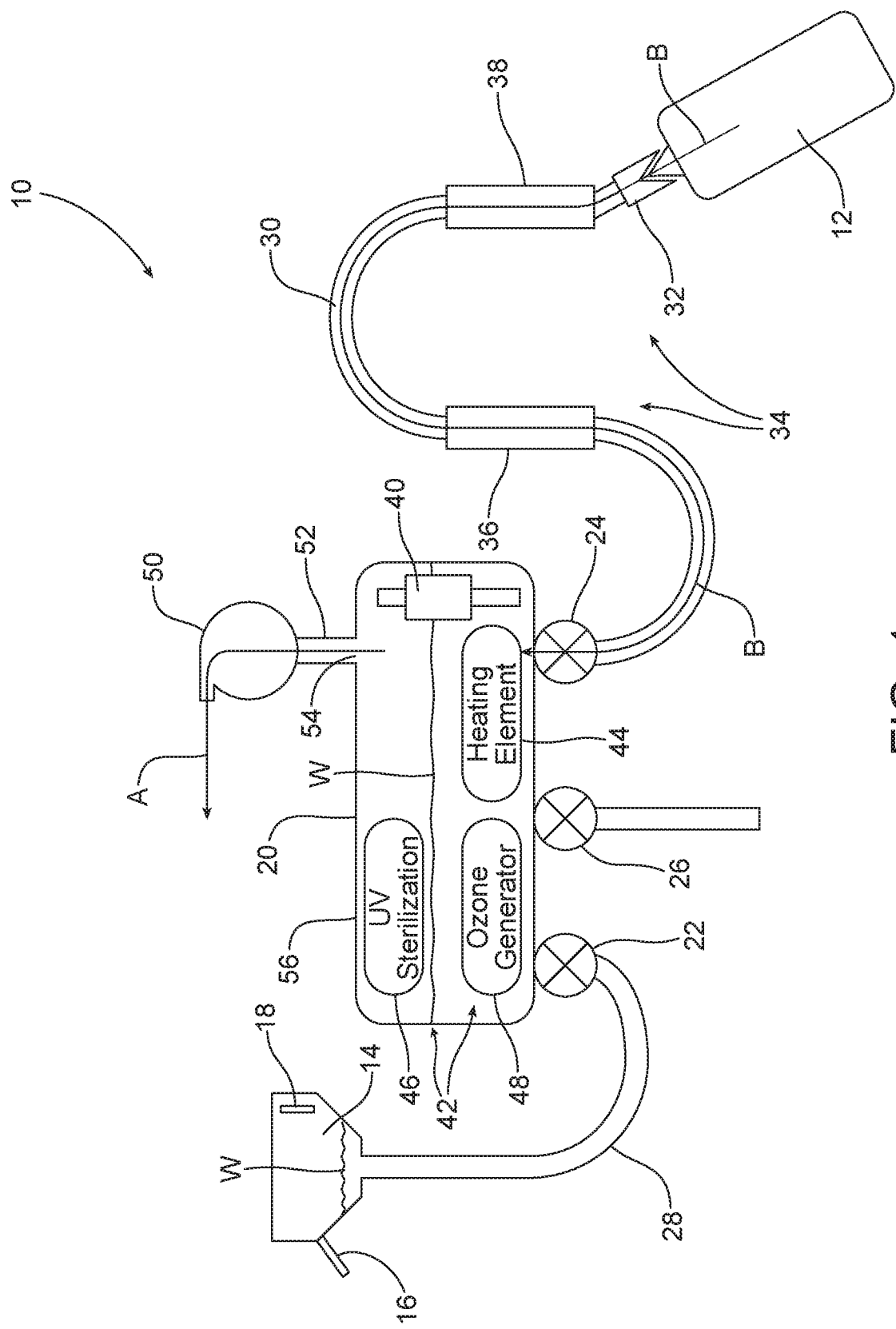
FIG. 1 is a schematic illustration of the water bottle filling system.
Figure 2:
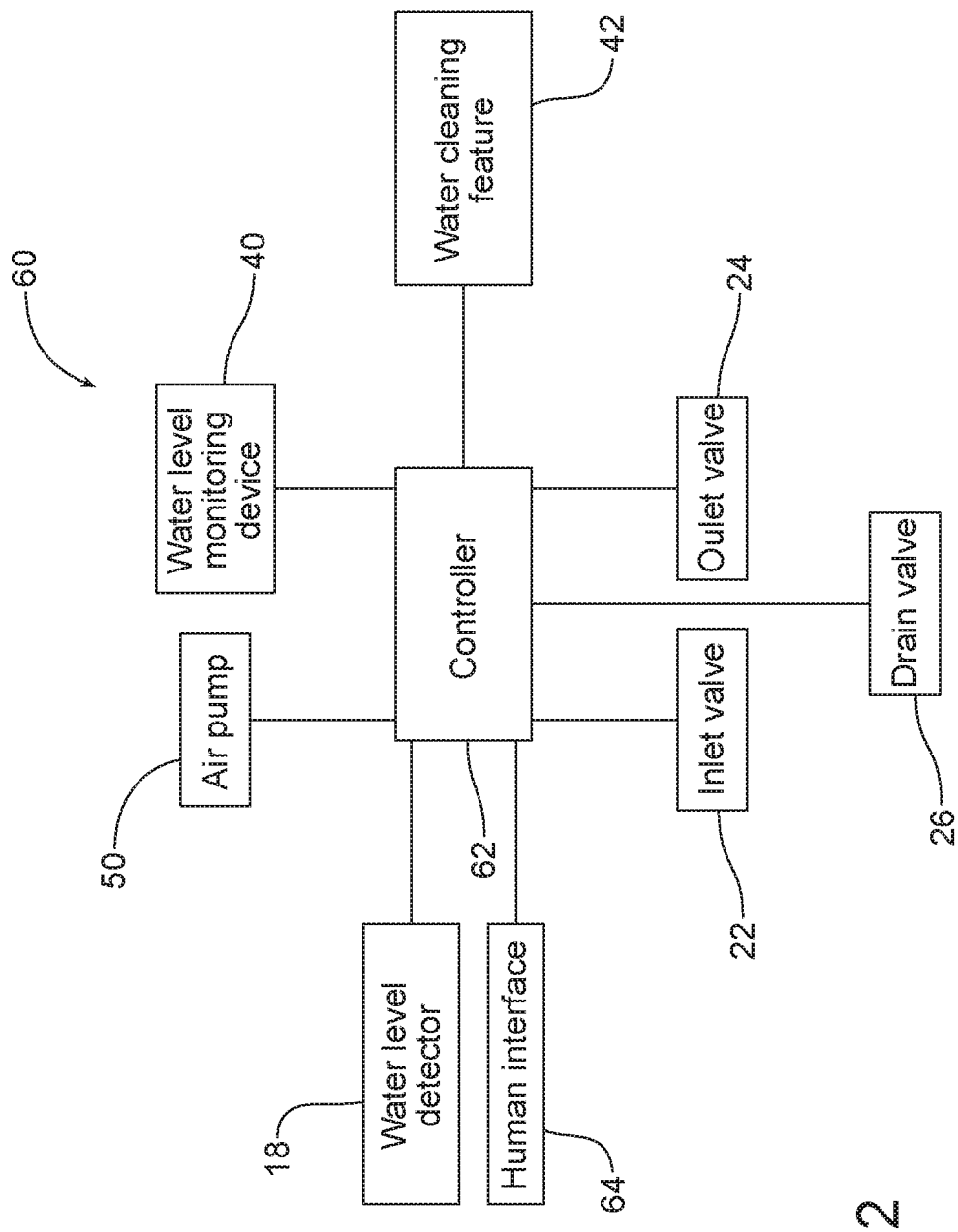
FIG. 2 is a schematic block diagram of the control system for the water bottle filling system.

Reference is now made to FIGS. 1 and 2 illustrating the new and improved water bottle filling system 10 that is particularly adapted to provide quick and efficient filling of refillable water bottle 12 without relying upon gravity.

In the illustrated embodiment, the water bottle filling system 10 includes a water collection vessel 14 adapted to collect water such as condensation from the climate control system evaporator of a motor vehicle, a dedicated atmospheric water generator, or rainwater delivered from a motor vehicle rainwater collection and conduit system. The water collection vessel 14 may be equipped with an optional spill/overflow feature 16. The water collection vessel 14 may also include an optional water level detector 18.

The water bottle filling system 10 also includes a water storage reservoir 20. The water storage reservoir 20 includes an inlet valve 22, an outlet valve 24 and a drain valve 26. The water collection vessel 14 is upstream from the water storage reservoir 20 and is connected thereto by means of a conduit 28 through the inlet valve 22. The outlet valve 24 is connected by the conduit 30 to a coupling 32 downstream from the outlet valve. The coupling 32 provides an airtight seal with the refillable water bottle 12. Such a coupling is known in the art.

A filter feature, generally designated by reference numeral 34, may be provided in the conduit 30 between the outlet valve 24 and the coupling 32. In the illustrated embodiment, the filter feature 34 comprises a carbon filter 36 and a re-mineralization filter 38. More particularly, the carbon filter 36 may comprise an activated carbon filter adapted to remove chemical contaminants from the water being delivered to the refillable water bottle 14 from the water storage reservoir 20. The re-mineralization filter 38 is provided downstream from the carbon filter 36 and is adapted to introduce desired minerals back into the water to enhance the taste and health benefits of the water.

The water bottle filling system 10 of the illustrated embodiment also includes a water level monitoring device 40, of a type known in the art, adapted to monitor the level of water W in the water storage reservoir 20. In addition, the water bottle filling system 10 also includes a water cleaning feature, generally designated by reference numeral 42. In the illustrated embodiment, the water cleaning feature 42 comprises a heating element 44, a UV water sterilization device 46 and an ozone generator 48. Here it should be appreciated that the water cleaning feature may comprise any one, any two or all three of these devices 44, 46, 48.

An air pump 50 is connected to the water storage reservoir 20 by means of a conduit 52 that is connected at a port 54 in the top wall 56 of the water storage reservoir 20. As will be described in greater detail below, the air pump 50 functions to move both air and water through the water bottle filling system 10 in an efficient and effective manner and allows (a) the transfer of water from the water collection vessel 14 to the water storage reservoir 20 and (b) the filling of the refillable water bottle 12 without relying upon gravity to move water through the system.

As best illustrated in FIG. 2, the water bottle filling system 10 also includes a control system generally designated by reference numeral 60. The control system 60 includes a controller 62. The controller 62 may take the form of a computing device such as a dedicated microprocessor or an electronic control unit (ECU) operating in accordance with instructions from appropriate control software. Thus, the controller 62 may comprise one or more processors, one or more memories and one or more network interfaces all in communication with each other over one or more communication buses.

In the illustrated embodiment, the controller 62 is connected to and configured to control operation of the inlet valve 22, the outlet valve 24, the drain valve 26 as well as the air pump 50. Further, the controller 62 is connected to and configured to control operation of the water cleaning feature 42 which, in the illustrated embodiment, includes the heating element 44, the UV sterilization device 46 and the ozone generator 48. As further illustrated in FIG. 2, the controller 62 is also connected to the water level monitoring device 40 and receives data therefrom respecting the level of the water W in the water storage reservoir 20. Further, the controller 62 may also be connected to the optional water level detector 18 and receive data therefrom respecting the level of water W in the water collection vessel 14.

As will become apparent from the detailed description of the method for collecting, cleaning and dispensing potable water described in greater detail below, the controller 62 is configure to (a) draw water, by the air pump 50, from the water collection vessel 14 into the water storage reservoir 20 through the inlet valve 22, (b) clean the water W in the water storage reservoir 20 by operation of the water cleaning feature 42, (c) draw air, by the air pump, from the refillable water bottle 12 through the outlet valve 24 and (d) force water from the water storage reservoir through the outlet valve into the refillable water bottle 12.

The method for cleaning and dispensing potable water may be broadly described as including the steps of collecting water W in the water collection vessel 14, transferring that water under pressure into the water storage reservoir 20 and dispensing that water under pressure into the refillable water bottle 12 downstream from the water storage reservoir. More specifically, the controller 62 initiates the transfer of water from the water collection vessel 14 to the water storage reservoir 20 by opening the inlet valve 22 while maintaining the outlet valve 24 and drain valve 26 closed. The air pump 50 is then activated by the controller 62 to force air in the direction of action arrow A from the water storage reservoir 20 thereby drawing the water under pressure from the water collection vessel 14 through the conduit 28 and the inlet valve 22 into the water storage reservoir 20. This action may be initiated automatically by the controller 62 when data received from the water level monitoring device 40 indicates a low water level condition within the water storage reservoir 20 and data received by the controller from the water level detector 18 indicates available water in the water collection bottle 12. At other times, this action may be initiated by an individual via operation of the human interface 64 connected to the controller 62. That human interface 64 may comprise a toggle switch, a push-button, a touchscreen of the motor vehicle or any other appropriate human interface device. Voice command control is also possible if the controller is equipped with a voice processor.

Once the water has been transferred from the water collection vessel 14 to the water storage reservoir 20, the controller 62 functions to close the inlet valve 22. Next, the controller 62 may be configured to initiate cleaning of the water W in the water storage reservoir 20 by means of the water cleaning feature 42 including the heating element 44, the UV sterilization device 46 and/or the ozone generator 48. For example, the heating element 44 could be utilized to heat the water W in the water storage reservoir 20 to boiling or some other temperature suited to clean the water for drinking.

The method may also include the step of connecting the refillable water bottle 12 downstream from the outlet valve 24 by means of the airtight coupling 32. When the operator desires to fill the refillable water bottle 12 with water W from the water storage reservoir 20, the individual may initiate this action by means of the human interface 64 connected to the controller 62. Once initiated, the controller 62 opens the outlet valve 24 while maintaining the inlet valve 22 and drain valve 26 in the closed state. The controller 62 then activates the air pump 50 so as to once again withdraw air from the water storage reservoir 20 (note action arrow A). As the pressure in the water storage reservoir 20 falls below the pressure of air inside the refillable water bottle 12, air is withdrawn from the refillable water bottle 12 through the airtight coupling 32, the conduit 30, including the re-mineralization filter 38 and the carbon filter 36, and the outlet valve 24 as shown by action arrow B. The air withdrawn from the refillable water bottle 12 bubbles through the water W in the water storage reservoir 20 before being expelled from the water storage reservoir by the air pump 50 as illustrated by action arrow A in FIG. 1.

After removing air by the air pump 50 from the refillable water bottle 12 and reducing the air pressure within the refillable water bottle, the controller 62 shuts off the air pump 50 while maintaining the conduit 52 and the port 54 open to ambient air pressure. At this point the ambient air pressure is greater than the air pressure inside the refillable water bottle 12. This pressure differential enables ambient air pressure to easily overcome the air pressure inside the refillable water bottle 12. Consequently, the ambient air pressure will force upon the water W in the water storage reservoir 20 moving water W out of that reservoir and through the conduit 30, including the carbon filter 36 and the re-mineralization filter 38, past the coupling 32 into the refillable water bottle 12. Once the refillable water bottle 12 is filled with water, the operator may shut off the water bottle filling system 10 by means of the human interface 64. This causes the controller to close the outlet valve 24.

The controller 62 may also be configured to prevent water in the water storage reservoir 20 from freezing. Thus, when the controller 62 receives data indicative of freezing ambient temperatures, the controller 62 may activate the heating element 44 to maintain the water W in the water storage reservoir above freezing. The controller 62 may also be configured to open the drain valve 26 and thereby drain the water W from the water storage reservoir 20. This may be done whenever desired by the operator through manipulation of the human interface 64, or periodically as per a predetermined time period programmed into the controller 62.

The foregoing has been presented for purposes of illustration and description. It is not intended to be exhaustive or to limit the embodiments to the precise form disclosed. Obvious modifications and variations are possible in light of the above teachings. For example, water level monitoring devices may be provided at other locations within the water bottle filling system 10 than those shown in the illustrated embodiment. All such modifications and variations are within the scope of the appended claims when interpreted in accordance with the breadth to which they are fairly, legally and equitably entitled.

What is claimed:

1. A water bottle filling system, comprising:
   a water storage reservoir having an inlet valve and an outlet valve;
   an air pump connected to said water storage reservoir and adapted to force air from the water storage reservoir and reduce pressure in the water storage reservoir below ambient pressure;
   a coupling downstream from said outlet valve; and
   a refillable water bottle connected by air tight seal to said coupling.

2. The water bottle filling system of claim 1, further including a water collection vessel upstream from said inlet valve.

3. The water bottle filling system of claim 2, further including a water level monitoring device monitoring a water level within said water storage reservoir.

4. The water bottle filling system of claim 3, further including a water cleaning feature that cleans water in said water storage reservoir.

5. The water bottle filling system of claim 4, wherein said water cleaning feature is selected from a group of devices consisting of a heating element, a UV water sterilization device, an ozone generator and combinations thereof.

6. The water bottle filling system of claim 5, further including a filter feature between said outlet valve and said coupling.

7. The water bottle filling system of claim 6, wherein said filter feature is selected from a group of filters consisting of a carbon filter, a re-mineralization filter and combinations thereof.

8. The water bottle filling system of claim 7, wherein said water storage reservoir further includes a drain valve.

9. The water bottle filling system of claim 8, wherein said coupling provides an airtight seal with said refillable water bottle.

10. The water bottle filling system of claim 9, further including a controller connected to said inlet valve, said outlet valve, said drain valve and said air pump.

11. The water bottle filling system of claim 10, wherein said controller is configured to (a) draw water, by said air pump, from said water collection vessel into said water storage reservoir through said inlet valve, (b) clean water in said water storage reservoir, (c) draw air, by said air pump, from said refillable water bottle through said outlet valve and (d) force, by way of a pressure differential between air pressure inside the refillable water bottle and an ambient air pressure, water from said water storage reservoir through said outlet valve into said refillable water bottle.

12. The water filling system of claim 11, wherein said controller is also connected to said water cleaning feature and said water level monitoring device.

13. A method for collecting, cleaning and dispensing potable water, comprising:
   collecting water in a water collection vessel;
   transferring said water under pressure provided by an air pump into a water storage reservoir;
   removing air, by said air pump, from said refillable water bottle; and
   dispensing said water under ambient pressure into a refillable water bottle downstream from said water storage reservoir.

14. The method of claim 13, including cleaning said water in said water storage reservoir by a water cleaning feature.

15. The method of claim 14, including opening an inlet valve and closing an outlet valve of said water storage reservoir prior to transferring water to said water storage reservoir.

16. The method of claim 15, including closing said inlet valve and opening said outlet valve prior to dispensing water to said refillable water bottle.

17. The method of claim 16, including connecting said refillable water bottle downstream from said outlet valve by an airtight coupling.

18. The method of claim 17, including monitoring a level of said water in said water storage reservoir.

19. The method of claim 18, including cleaning said water by at least one of UV sterilization, ozone generation and heating.

\* \* \* \* \*